Figure 1:
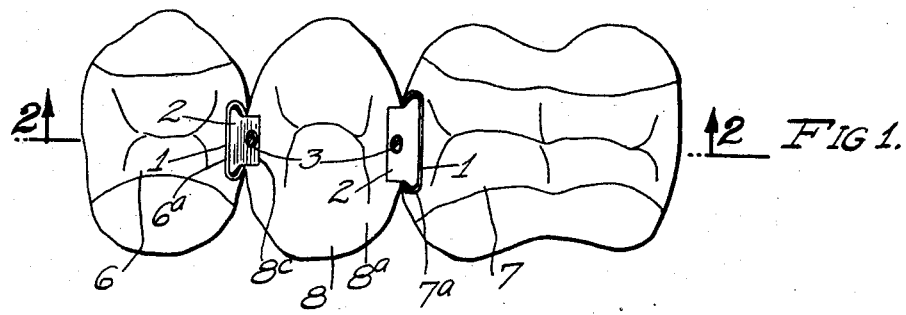

March 4, 1930.　　　　M. C. LASKY　　　　1,749,493

SEMIFIXED DENTAL BRIDGE

Filed March 21, 1928

INVENTOR.
MERVYN C. LASKY.
BY A. B. Bowman
ATTORNEY

Patented Mar. 4, 1930

1,749,493

UNITED STATES PATENT OFFICE

MERVYN C. LASKY, OF HOLLYWOOD, CALIFORNIA

SEMIFIXED DENTAL BRIDGE

Application filed March 21, 1928. Serial No. 263,234.

My invention relates to a dental bridge, particularly of the type known as the semifixed dental bridge which the patient cannot of himself remove, but which may be removed by the dentist.

The objects of my invention are: first, to provide a bridge of this class which may be easily mounted in position and secured in place either rigidly with the permanent adjacent supporting teeth, or slightly movable with respect thereto, so as to provide for slight relative up and down, as well as lateral movement of the permanent teeth; second, to provide a bridge of this class which is removably mounted on the permanent teeth and secured thereto by means which will not irritate the tongue at the inside of the mouth, which will appear ordinarily as a permanently fixed bridge; third, to provide a bridge of this class which is secured in position by securing means at the biting surface sides of the teeth so that the same are substantially hidden and out of the way, but at the same time readily accessible; fourth, to provide a dental bridge of this class in which the bridge is secured to the permanent teeth by screws which extend from one of the teeth at an angle so that the screws are readily accessible and secure the same relative to each other in such a manner that slight movement may be provided in various directions, the positioning of the screw also providing a very economical construction; fifth, to provide as an article of manufacture sets of connecting, interlocking, retaining and supporting members in the form of male and female members which may be separately secured to restorations in permanent teeth and to an artificial tooth, or teeth, so that the artificial teeth may be removably mounted on the permanent teeth, and whereby the fitting of the one relative to the other may be accomplished in a minimum amount of time and with the expenditure of little effort; to provide members of this class which are applicable for either posterior or anterior bridges and for upper and lower bridges; seventh, to provide a mounting of this class for semi-fixed bridges whereby bridges may be mounted on live teeth and on inlays therein and are not limited to being mounted on devitalized teeth crowns, or other similar restorations; eighth, to provide as a whole a novelly constructed bridge of this class and novel means for mounting the same on permanent teeth; and, ninth, to provide a bridge and means of this class which are very simple and economical of construction, durable, efficient and which will not readily deteriorate or get out of order.

Figure 2:
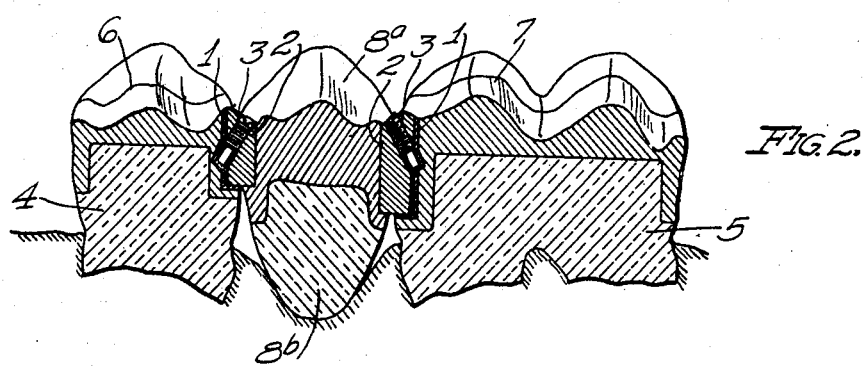
Figures 3, 5:
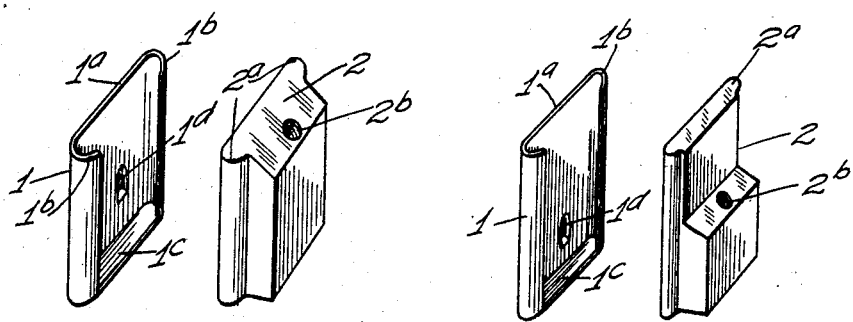
Figure 4:
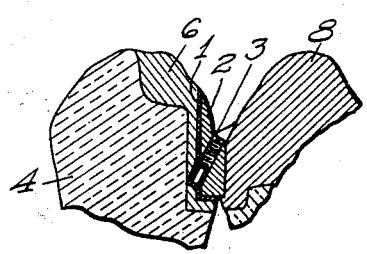

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is an occlusal view or a view from the biting surface of my bridge in one form of construction, showing the same mounted on its supporting teeth; Fig. 2 is a sectional elevational view thereof taken through line 2—2 of Fig. 1; Fig. 3 is a perspective view of a pair of the connecting members between an artificial and a permanent tooth and used for the posterior teeth; Fig. 4 is a fragmentary sectional view similar to that of Fig. 2, showing the bridge mounting of anterior teeth; and, Fig. 5 is a perspective view of a set of connecting members for connecting the bridge to anterior teeth.

Like characters of reference refer to similar parts and portions throughout the views of the drawings.

The means for connecting, supporting and mounting of my bridge to the permanent teeth consists preferably and primarily of a socket member 1, a male member 2 and a screw 3. The socket member 1 may be made of sheet metal or moulded as a thin shell from gold alloys or other suitable metals and consists of a back wall 1ª the lateral edges of which are turned outwardly and inwardly in curved form, as indicated by 1ᵇ forming a longitudinal recess of dovetail cross section, said recess being open at its upper end. The lower end of the socket member is provided with a bottom plate forming the bottom of the recess, which plate is preferably integrally secured to the back plate 1$^a$ and the portions 1$^b$ retaining the portions 1$^b$ in fixed relation relative to each other. In the back plate 1$^a$ intermediate the portions 1$^b$ and inwardly from the normally outer end of the socket member and outwardly from the bottom plate 1$^c$ is formed an opening or recess 1$^d$ which may be formed by depressing a portion of the back plate 1$^a$ outwardly, as shown in Figs. 2, 3, 4 and 5. The male member 2 is preferably a solid metal member in the form of a plug which is adapted to fit into the recess of the socket member. This male or plug member is provided at its lateral edges and at the one side thereof with longitudinal ribs 2$^a$ which are adapted to be enclosed by the portions 1$^b$. The lower end of the member 2, when mounted on or in the socket member, rests on the bottom plate 1$^c$. At the upper end of the member 2 is provided a threaded hole 2$^b$ which extends at an angle thereinto and through the side thereof adjacent the socket member 1, as shown best in Figs. 2 and 4. In this threaded hole is mounted the screw 3, the inner end of which is adapted to extend into the recess 1$^d$, in order to prevent withdrawal of the member 2 from the member 1 at the open end of the recess in which the member 2 is positioned. In order to prevent damage to the threads of the screw 3, the inner end thereof is preferably turned down so as to provide a smooth pin which engages the wall forming the recess 1$^d$. In Figs. 1 and 2 of the drawings, which show posterior teeth, the teeth 4 and 5 are permanent live teeth, that is, teeth from which the nerves have not been removed. These teeth are respectively provided with inlays 6 and 7. In the adjacent sides of these inlays are provided recesses 6$^a$ and 7$^a$, respectively, in which socket members 1 are secured by soldering. The artificial tooth 8, as shown, consists of an upper or outer metallic portion 8$^a$ at the inner end of which is mounted a porcelain portion 8$^b$. The metallic portion 8$^a$ is provided at its opposite sides with vertical recesses 8$^c$ into which the male or plug members are secured. These members 2 are preferably secured to the artificial tooth by soldering the same to the metallic portion 8$^a$ of the artificial tooth. The recesses 6$^a$ and 7$^a$ are cut into the wax model from which the inlays are made; then the parts are soldered into their positions in the recesses.

It will be here noted that the portions of the member 2 positioned in the socket members may be tightly fitted in the latter, but the same are preferably loosely positioned therein so as to provide slight movement of the permanent teeth and bridge in all directions. This loose fit may be provided by making the ridges 2$^a$ slightly smaller than the dovetail recess in the socket member, and the sides of the members 2 adjacent the socket members may be slightly beveled, if desired, to provide greater clearance. More or less movement of the bridge relative to the permanent teeth may also be allowed by adjusting the screw 3, it being noted that the inner wall of the recess 1$^d$ may be of less inclination for such purpose so as to provide substantially a wedging action by the screw, if desired.

In Fig. 5 of the drawings are shown connecting members 1 and 2 of slightly different design, adapting the same to be used for anterior teeth, as shown in Fig. 4. The member 1 is slightly longer than that shown in Fig. 3 and the portion of the member 2 through which the screw 3 extends is positioned a considerable distance inwardly from the outer end of the ridges 2$^a$ positioned within the socket member. The thickness of the member 2 above the portion through which the screw extends, however, is slightly thicker than the width of the ridges so that the whole of the recess in the member 1 is filled. The upper ends of the socket member 1 and the member 2 are ground off to conform to the shape of the teeth, as shown in Fig. 4.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a dental bridge, a socket member securable to a tooth, a male member securable to another tooth adapted to fit into said socket member, one of said members having a recess, and a screw mounted in the other member at an angle from the end thereof adapted to extend into said recess and retain said members relative to each other.

2. In a dental bridge, a socket member securable to a tooth and provided with inwardly extending portions at its lateral sides, a male member securable to another tooth and provided with laterally extended portions at its sides, said male member being adapted to be mounted within the socket member and the laterally extended portions thereof to be retained by the inwardly extending portions of the socket member, one of said members having a recess at the side adjacent the other member, and a screw mounted in the other member at an angle therewith from its normally outer end, said screw being adapted to extend with its end into said recess.

3. In a dental bridge, a socket member securable to a tooth, a male member securable to another tooth adapted to fit into said socket member, said socket member having a recess in its inner wall and spaced from its normally outer end, and a screw mounted in the male member from the normally outer end thereof and at an angle therewith, the inner end of said screw being adapted to extend into said recess.

4. In a dental bridge, a socket member securable to a tooth and provided with inwardly extending portions at its lateral sides, a male member securable to another tooth and provided with laterally extended portions at its sides, said male member being adapted to be mounted within the socket member and the laterally extended portions thereof to be retained by the inwardly extending portions of the socket member, said socket member having a recess in its wall at the side adjacent said male member, said recess being spaced inwardly from the normally outer end of the socket member, and a screw mounted at an angle in said male member from the normally outer end thereof, the inner end of said screw being adapted to extend into said recess.

5. In a dental bridge, the combination with a pair of permanent teeth, of restorations in said teeth, an artificial tooth positioned intermediate said restorations and having laterally extended portions interlocked with the restorations, and screws mounted in the extended portions of said artificial tooth at an angle from the biting surface thereof and extending with their inner ends into said restorations for locking said artificial tooth relative to said permanent teeth.

6. In a dental bridge, the combination with a pair of spaced apart permanent teeth, of restorations on said teeth, said restorations having at their adjacent sides sockets, an artificial tooth positioned intermediate said permanent teeth and provided at the sides thereof with extended portions slidably mounted in said sockets from the biting surfaces of said permanent teeth, and screws mounted in the extended portions of said artificial tooth at an angle relative thereto and operable from the biting surface side thereof, the inner ends of said screws extending beyond said extended portions into said sockets.

7. In a dental bridge, the combination with a pair of spaced apart permanent teeth, of inlays on said teeth, said inlays having at their adjacent sides sockets, an artificial tooth positioned intermediate said permanent teeth and provided at the sides thereof with extended portions slidably mounted in said sockets from the biting surfaces of said permanent teeth, and screws mounted in the extended portions of said artificial tooth at an angle relative thereto and operable from the biting surface side thereof, the inner ends of said screws extending beyond said extended portions into said sockets.

8. In a dental bridge, the combination with a permanent tooth, of an inlay mounted therein, a socket member secured in said inlay at the outer side thereof, an artificial tooth, a male member secured to the side of said artificial tooth and positioned within said socket, and a screw mounted angularly in said male member from the biting surface side of the artificial tooth, the inner end of said screw extending into the wall of said socket member.

9. In a dental bridge, the combination with a permanent tooth, of a restoration having a dovetail recess at the side thereof, said recess being open at its upper end, the wall forming said recess having a small screw receiving recess inwardly from the outer end of the tooth, and an artificial tooth having a dovetail lug at the side thereof adapted to be inserted into said dovetail recess, and a screw mounted in said dovetail lug from the outer end thereof and adapted to extend with its inner end into the recess in the wall of said restoration.

10. In a dental bridge, the combination with a permanent tooth, of a restoration for said tooth, a socket member secured to the side of said restoration, said socket member having a dovetail recess open at its upper end, an artificial tooth, a male member of dovetail shape secured to the side of said artificial tooth and adapted to slide into said dovetail recess at the upper end thereof, and a screw mounted in said male member from the normally outer end thereof and extending thereinto at an angle, the inner end of said screw being adapted to extend into the wall of said socket member forming said recess.

In testimony whereof, I have hereunto set my hand at Hollywood, California, this 7th day of March, 1928.

MERVYN C. LASKY.